US012042747B1

(12) United States Patent
Curran

(10) Patent No.: US 12,042,747 B1
(45) Date of Patent: Jul. 23, 2024

(54) COMPETITION STARTING SYSTEM

(71) Applicant: Joseph L. Curran, Bethesda, MD (US)

(72) Inventor: Joseph L. Curran, Bethesda, MD (US)

( * ) Notice: Subject to any disclaimer, the term of this patent is extended or adjusted under 35 U.S.C. 154(b) by 0 days.

(21) Appl. No.: 18/538,681

(22) Filed: Dec. 13, 2023

(51) Int. Cl.

| | |
|---|---|
| ***A63K 3/02*** | (2006.01) |
| ***A63B 71/00*** | (2006.01) |
| ***A63B 71/06*** | (2006.01) |
| ***G08B 7/06*** | (2006.01) |
| ***G08C 17/02*** | (2006.01) |

(52) U.S. Cl.
CPC .......... *A63K 3/023* (2013.01); *A63B 71/0009* (2013.01); *A63B 71/0622* (2013.01); *G08B 7/06* (2013.01); *G08C 17/02* (2013.01); *A63B 2071/0625* (2013.01); *A63B 2225/50* (2013.01); *A63B 2225/74* (2020.08); *A63B 2244/20* (2013.01)

(58) Field of Classification Search
CPC A63K 3/023; A63B 71/0009; A63B 71/0622; A63B 2071/0625; A63B 2225/50; A63B 2225/74; A63B 2244/20; G08B 7/06; G08B 1/08; G08C 17/02
See application file for complete search history.

(56) References Cited

U.S. PATENT DOCUMENTS 3,596,103 A 7/1971 Matthews
3,665,452 A 5/1972 MacCreadie
4,853,674 A 8/1989 Kiss
6,002,336 A * 12/1999 Widding ............ A63B 71/0605 482/8
6,181,236 B1 1/2001 Schneider, Jr.
6,794,989 B2 9/2004 Naegely et al.
7,193,167 B1 3/2007 Brice
10,252,143 B1 * 4/2019 Schott ...................... G04F 10/00
11,013,977 B2 5/2021 Santino, Jr.
2003/0006903 A1 * 1/2003 Naegely .................... G08B 1/08 340/4.12
2010/0102938 A1 * 4/2010 Delia ................. A63B 71/0616 340/326
2015/0271454 A1 * 9/2015 Saunders ............... H04N 23/62 348/157
2016/0114238 A1 * 4/2016 Santino, Jr. ............ A63K 3/023 340/4.13
2018/0365939 A1 * 12/2018 Inglot ....................... G10K 5/00
2022/0143461 A1 * 5/2022 DeAngelis .......... H04L 67/1095
2022/0301358 A1 9/2022 Semler

FOREIGN PATENT DOCUMENTS

TW M459009 U * 8/2013

* cited by examiner

*Primary Examiner* — Adnan Aziz
(74) *Attorney, Agent, or Firm* — Invention To Patent Services; Alex Hobson

(57) ABSTRACT

A competition starting system utilizes a start-receiver to detect a venue starting sound and transmits a wireless signal to start signaling devices having a speaker to emit one or more lights and a lane start sound to indicate the start of the competition. This system may be used to enable hearing impaired competitors to see a start light at their lane in race competitions. A start-controller may have a number of buttons to initiate various lights and sounds from the start signaling devices and to place the start-receiver in a start mode. The buttons may correspond to ready, mark and start. The start-receiver may be programmed to detect a start sound, when in the start mode, from a venue sound device that is above a threshold decibel level and send instructions to the start signaling device to emit the start light.

17 Claims, 5 Drawing Sheets

COMPETITION STARTING SYSTEM

BACKGROUND OF THE INVENTION

Field of the Invention

The invention relates a competition starting system that utilizes a start-receiver to detect a starting sound and transmits a wireless signal to start signaling devices having a speaker to emit a lane start sound and/or one or more lights to indicate ready, mark and start.

Background

Competitions such as race competition have become very competitive and often times a difference of fractions of a second separate the winner from the runner up. Therefore, providing start signals to competitors at the same time has become critical. Also, competitors may be hearing impaired including being deaf and may not be able to hear a start sound, therefore some other form of start signaling is required, such as a start light.

Most venues for competitions such as race competitions have a venue start speaker that produces a venue start sound and visual means to provide start signaling to hearing impaired competitors are placed inconveniently requiring the competitor to assume a non-competitive position to see the signal resulting in the loss of several tenths of a second on the start.

SUMMARY OF THE INVENTION

The invention is directed to a competition starting system that utilizes a start-receiver to detect a starting sound from a venue starter and transmits a wireless signal to a start signaling devices having one or more lights to indicate the start of the competition and may have lane speaker to emit a lane start sound. A start signaling device may have one or more lights to indicate ready, mark and start or a competition. A start-controller may be used to initiate the ready, mark and start modes of a competition and may be a separate component from the start-receiver.

An exemplary competition starting system has a start-receiver to detect a venue start sound and transmits a wireless signal to start signaling devices having a start light device to produce a start light to indicate that the competitors should start the competition, such as the swimming race. The start signaling devices may also have a lane speaker to emit a lane start sound to indicate ready, mark and start of the competition. A start-controller may have a number of buttons to initiate various lights and sounds from the start signaling devices. The buttons may correspond to ready, mark and start, to indicate to the competitor to get ready, take their mark, and then start the competition, respectively.

The start-controller may place the start-receiver in a "start mode" wherein the start detector, such as a microphone, of the start-receiver is configured to detect a venue start sound. The start-controller may send start instructions to the start-receiver by a wireless signal. The start-receiver may go into "start mode" and may be programmed to detect a start sound from a venue sound device, such as a venue start speaker, horn, gun and the like. The start-receiver and start-controller may be two separate components to enable the start-receiver to be place proximal to the start venue sound device to prevent any time delay between the venue start sound and the start signal light and/or start sound emitted from the start signaling devices. Also, having the two components separate may enable portability of the start-controller such that the person controlling the start-controller and start modes of the competition can have a better location for viewing the competitors and when to move into various modes.

The start-receiver may be configured to detect a start sound that is a threshold decibel increase over the ambient sound, or a certain decibel level or higher. The decibel threshold may be about 75 decibels or higher, about 100 decibels or more, about 125 decibels or more, about 150 decibels or more, or even about 170 decibels or more or any range between and including the decibel levels provided. This threshold may be the decibel level over the ambient decibel level or an absolute decibel level sensed by the microphone. The start-receiver may only go into start sound detection mode or "start mode". when the mark button or start button on the start-controller is activated or when a start mode button on the start-receiver is activated. Note that the venue start device may be speaker, horn, or gun, or any other sound device that makes a loud noise to indicate the start of a competition.

A start signaling device may be configured proximal to the competitors such that each competitor can see a single start signaling device or a start signaling device may be configured at each lane of a race competition, or may be configured between lanes. When a start signaling device is configured between lanes, the competitors in either adjacent lane can hear and see any starting sound or lights, respectively.

The start-receiver has a controller, such as a microprocessor or microcontroller to control the functions of the start-receiver and to control the wireless signal transmission from the start-receiver wireless signal transmitter. The start-receiver may also have a wireless signal receiver configured to receive wireless signals. Also, the start-receiver may have a battery that may be a rechargeable battery that can be charged through the charging port. In addition, the start signaling device has a controller, such as a microprocessor or microcontroller, to control the functions of the device. Also, the start signaling device has a battery that may be a rechargeable battery that can be charged through the charging port.

The start-controller has a controller, such as a microprocessor or microcontroller to control the functions of the start-controller and to control the wireless signal transmission from the start-controller wireless signal transmitter. Also, the start-controller may have a battery that may be a rechargeable battery that can be charged through the charging port. In addition, the start signaling device has a controller, such as a microprocessor or microcontroller, to control the functions of the device. Also, the start signaling device has a battery that may be a rechargeable battery that can be charged through the charging port.

The start-controller may have a plurality of buttons, including a ready button, a mark button and a start button. These buttons may be separate buttons or may be buttons on a touch screen configured on the start-controller. Also, these buttons may be on a key board or a mobile device that is linked to the system, such as a cell phone, mobile phone, tablet computer or laptop computer, for example. The ready and mark button may initiate instructions to the start signaling device through the wireless signal of the start-controller. When the ready button is activated, the start-controller may send ready instructions through the wireless signal to the start signaling device. When the mark button is activated the start-controller may send mark instructions through the wireless signal to the start signaling device. Also, when the mark button is activated the start-controller may send instructions through the wireless signal to the start-receiver to place the start-receiver in a "start mode." When the start button is activated, the start-controller may send start instructions through the start-controller wireless signal to the start signaling device. This may be done for practice, wherein the system does not use a venue start sound to start the competitor. Alternatively, when the start button is activated, or when the mark button is activated on the start-controller, the start-controller may send start instructions through the start-controller wireless signal to the start-receiver to place the start-receiver in a "start mode." When the start-receiver detects a venue start sound, when in this "start mode", the start-receiver may send a wireless signal with start instructions to the start signaling devices. The start light may then be illuminated on the start signaling devices in unison or within about 0.01 seconds of each other or less and preferably within about 0.005 seconds of each other.

The start signaling device may have corresponding output devices or indicators, such as a ready light device, a mark light device and a start light device. Note that a single light device may be configured to produce the ready light, mark light and/or start light. Also, the start signaling device may have a lane speaker that is configured to emit various lane sounds. A lane sound may be a ready sound, end of the ready period sound, a mark sound and a start sound. Each of these sounds may be distinctive sounds to enable a competitor to know by the sound what stage of starting the competition they are in. The sounds may differ in decibel levels, tone or frequency of the sound, or in the on-off time periods of the sounds. A sound may be short burst of sound with an on-sound period of time and an off-period of time between these bursts.

The ready button on the start-controller may be activated, such as by manually pushing or touching the button, to indicate that the competitors are to get ready for the competition. The start signaling device receives the wireless signal with the ready instructions from the start-controller and then illuminates a ready light from the ready light device and/or emits a ready sound from lane speaker. The ready light device may flash to indicate that the competitors have time to get ready. Also, the ready sound may be short consecutive bursts of sound to indicate to get ready. The ready button on the start-receiver may be pressed again to initiate an end of the ready period and this may send a wireless signal to the start signaling device to initiate one or more lights to illuminate and/or sounds to be emitted from the lane speaker. The ready light device may change the ready light from a flashing light to a steady light, such as a steady red color light. Also, the ready sound may be a long continuous sound that indicates the end of the ready period.

The mark button on the start-controller may be pushed to indicated that the competitors are to take their mark for the competition. The start signaling device then receives the wireless signal with the mark instructions from the start-controller and then illuminates a mark light from a mark light device and/or emits a mark sound from lane speaker. The mark light may be a constant light, such as a blue light. The mark sound may be a specific number of short sounds or a continuous sound for a period of time. Again, the mark light device and the ready light device may be a single light device that emit different types of light for the mark light and ready light. The mark light and ready light may be different colors or may differ in on-off periods and/or intensity of the light, or lumens of light emitted. Also, when the ready button is activated on the start-controller, a signal may be sent to the start-receiver to put the start-receiver in "start mode", wherein the start-receiver is configured to detect a venue start sound as described herein with the start detector, such as a microphone.

The mark button on the start-controller may be pushed to initiate a start mode, a mode wherein the start-receiver is configured to send start instructions to the start signaling device when a venue start sound is detected. When the venue start sound is detected due, a sound above a threshold level, the start-receiver sends the start instructions via a wireless signal to the start signaling devices. The start signaling devices receive the wireless signal with the start instructions and illuminates a start light from the start light device and/or emits a start sound from lane speaker. The start light may be a constant light, such as a green light. When pressing the start button on the start-controller, a start mode indicator, such as a light, on the start-receiver may be illuminated to indicate that the start-receiver is in the "start mode." Also, in some embodiments, activating the start button may illuminate the start light to be illuminated from the start light device of the start signaling device. Again, the start light, ready light and mark light may all be produced from a single light device.

The start-controller may have a reset button that sends wireless signals to the start-receiver and/or the start signaling device to reset the system and turn off all start mode indicators and/or ready, mark and light devices on the start signaling device. The reset button may also reinitialize the code in the controllers of the start-receiver, start-controller and/or the start signaling device to prepare for the start of another competition.

The start-receiver and start-controller may be configured in separate housings so that the start-receiver can be configured proximal to the venue start device and the start-controller can be configured more proximal to the competitor and the starting blocks or line in the case of races. Note that the start-receiver and start-controller maybe configured in a single housing however.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
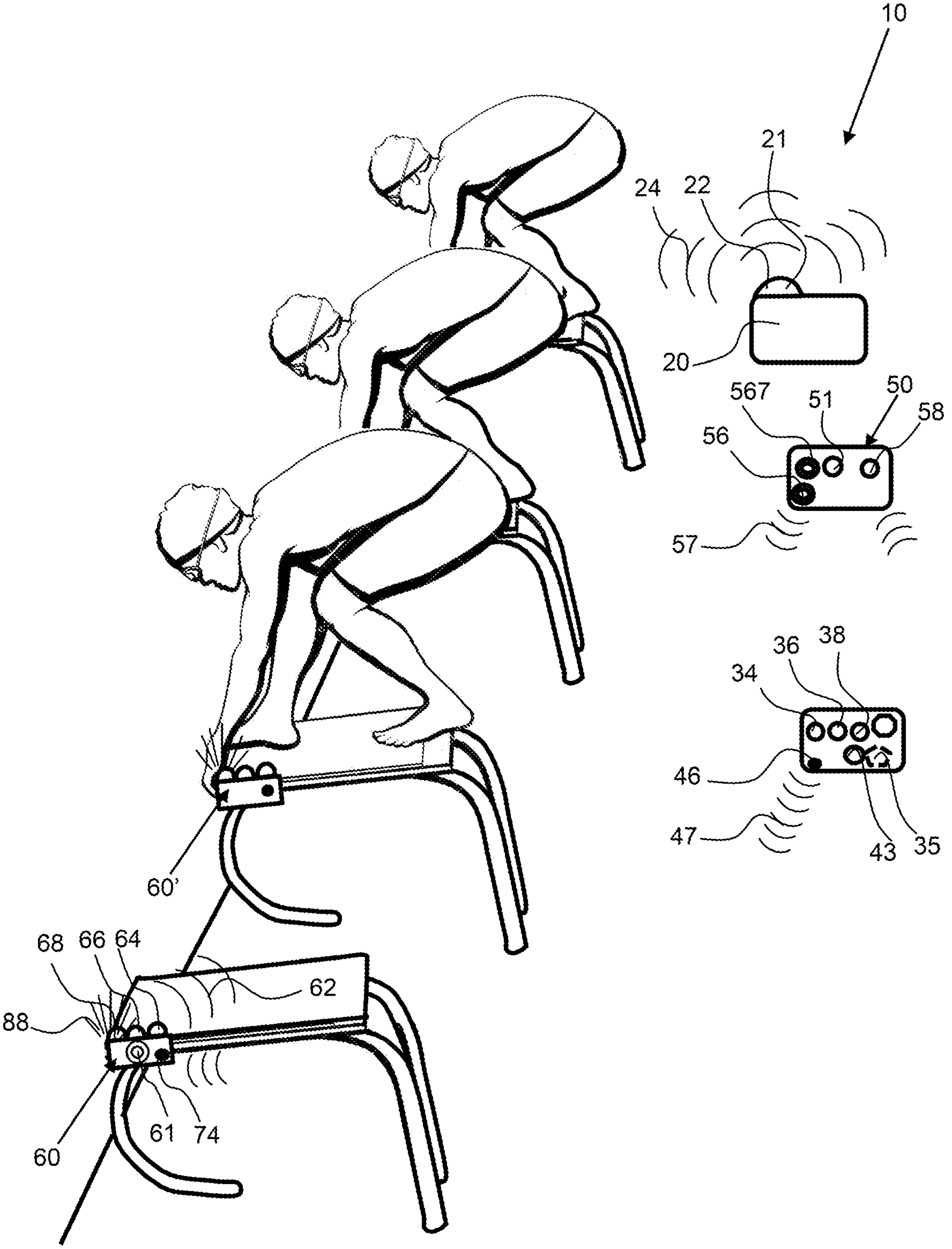
FIG. 1 shows an exemplary competition starting system configured at a swimming event with the start-receiver configured proximal to the venue start device for detecting a starting sound and transmitting a wireless signal to the start signaling devices with start instructions to initiate a lane start sound to be emitted from the lane speaker and to emit a start light from the start light device to indicate a start of the competition.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations, and improvements of the described embodiments, will occur to those skilled in the art and all such alternate embodiments, combinations, modifications, improvements are within the scope of the present invention.

Referring now to the FIGS., an exemplary competition starting system 10 has a start-receiver 50 to detect a venue start sound 24 from a venue starter 20 (venue start device), and transmits a wireless signal 57 to the start signaling devices 60 having a lane speaker 61 to emit a lane sound 62 and a start light device 68 to produce a start light 88 to indicate that the competitors should start the competition, such as the swimming race. As shown a start-controller 30, which may be a separate device from the start-receiver, may have a number of buttons to initiate various lights and sounds of the start signaling devices. The buttons may correspond to ready, mark and start, to indicate to the competitor to get ready, take their mark, and then start the competition, respectively. The start-receiver 50 may be programmed to detect a venue start sound 24 from a venue sound device 21, such as a venue start speaker 22. The start-receiver may be configured to detect a start sound that is a threshold decibel increase over the ambient sound, or a certain decibel level or higher. The start-receiver 50 may only go into start sound detection mode, when the start mode is activated, such as by activating the start mode button 51 on the start-receiver 50, or by activation of the mark button 36 on the start-controller, which may then send a wireless signal to the start-receiver, to go into start mode.

As described herein, the start-receiver and start-controller may be configured in the same housing or be two separate devices. A separate start-controller may enable more mobility and provide a starter with better perspective for starting the ready, mark and start modes. Also, separate start-controllers and start-receivers enables the start-receiver to be positions proximal to the venue start device to avoid any time delay between detection of the venue start sound.

Note that the venue count device 21 may be horn, or gun, or any other sound device that makes a loud noise to indicate a start of competition. The start signaling device 60 has a wireless signal receiver 74 that receives the wireless signal 57 from the start-receiver 50. As shown a start signaling device is configured at each lane, but may be configured between the lanes such that competitors in either adjacent lane can hear and see any starting sound or lights, respectively.

As shown in FIGS. 2 to 5, the start-receiver 50 has a controller 55, such as a microprocessor or microcontroller to control the functions of the start-receiver and to control the transmission of the wireless signal 57 to initiate the start of the competition. The start-receiver 50 may have a wireless signal receiver 567 to receive a wireless signal from the start-controller wireless signal transmitter 46 with start instructions to enter the "start mode." The start-receiver may have a wireless signal transmitter 56 to transmit a wireless signal with start instructions to the start-receiver. The start-receiver has a start detector 52, such as a microphone 53 to detect the start venue sound. The start-receiver may have a start mode button 51 to place the start-receiver in the "start mode", wherein detection of a start venue sound above a threshold sound level as described herein, initiates the wireless signal transmitter 56 to send a wireless signal 57 (shown in FIG. 5) with start instructions to the start signaling devices 60. A start mode indicator 58, such as a light may be illuminated when the start-receiver is placed in a "start mode." Also, the start-receiver 50 has a battery 59 that may be a rechargeable battery that can be charged through the charging port 599. The start-receiver may be configured in a housing 54 as shown.

As shown in FIGS. 2 to 5, the start-controller 30 has a controller 35, such as a microprocessor or microcontroller to control the functions of the start-controller and to control the wireless signal transmission from the wireless signal transmitter 46. Also, the start-receiver 30 has a battery 37 that may be a rechargeable battery that can be charged through the charging port 49. The start-controller may be configured in a housing 39, which may be hand-held housing and may be configured in a portable electronic device, such as a mobile phone, or tablet computer, or laptop computer. The start-controller may have a microphone 33 for detecting sounds including verbal commands.

The start-controller 30 may have a plurality of buttons, including a ready button 34, a mark button 36 and a start button 38. Each of these buttons may initiate instructions to the start signaling device 60 through the wireless signal 47. When the ready button is activated, the start-receiver may send ready instructions through the wireless signal 47 to the start signaling device to initiate a ready light 84 to illuminate. When the mark button 36 is activated, the start-controller 30 may send mark instructions through the wireless signal 47 to the start signaling device to initiate a mark light 86. When the mark button 36 is activated, the start-receiver may send start instructions through the wireless signal 47 to the start-receiver 50 to place the start-receiver in a "start mode", wherein when the start-receiver 50 detects a venue start sound 24, the start-receiver 50 sends a wireless signal 57 to the start signaling devices 60 to initiate a start light 68 and in some cases a start sound. Also, the start button 38 on the start-controller 30 may be activated to send a wireless signal 47 to the start signaling device 60 to initiate a start light 88 to illuminate from a start light 68, and this may be used for practice situations, wherein there is no venue start sound. Also, a lane sound 62 may be emitted, a lane start sound when the start button 38 on the start-controller is activated.

The start signaling devices may each have corresponding output devices or indicators, such as a ready light device 64, a mark light device 66 and a start light device 68. Note that a single light device may be configured to produce the ready light 84, mark light 86 and/or start light 88. Also, the start signaling device may have a lane speaker 61 that is configured to emit various lane sounds 62. A lane sound may be a ready sound, end of the ready period sound, a mark sound and a start sound. Each of these sounds may be distinctive sounds to enable a competitor to know by the sound what stage of starting the competition they are in.

Likewise, the start signaling device 60 has a controller 65, such as a microprocessor or microcontroller, to control the functions of the device. Also, the start signaling device has a battery 67 that may be a rechargeable battery that can be charged through the charging port 69.

Figure 2:
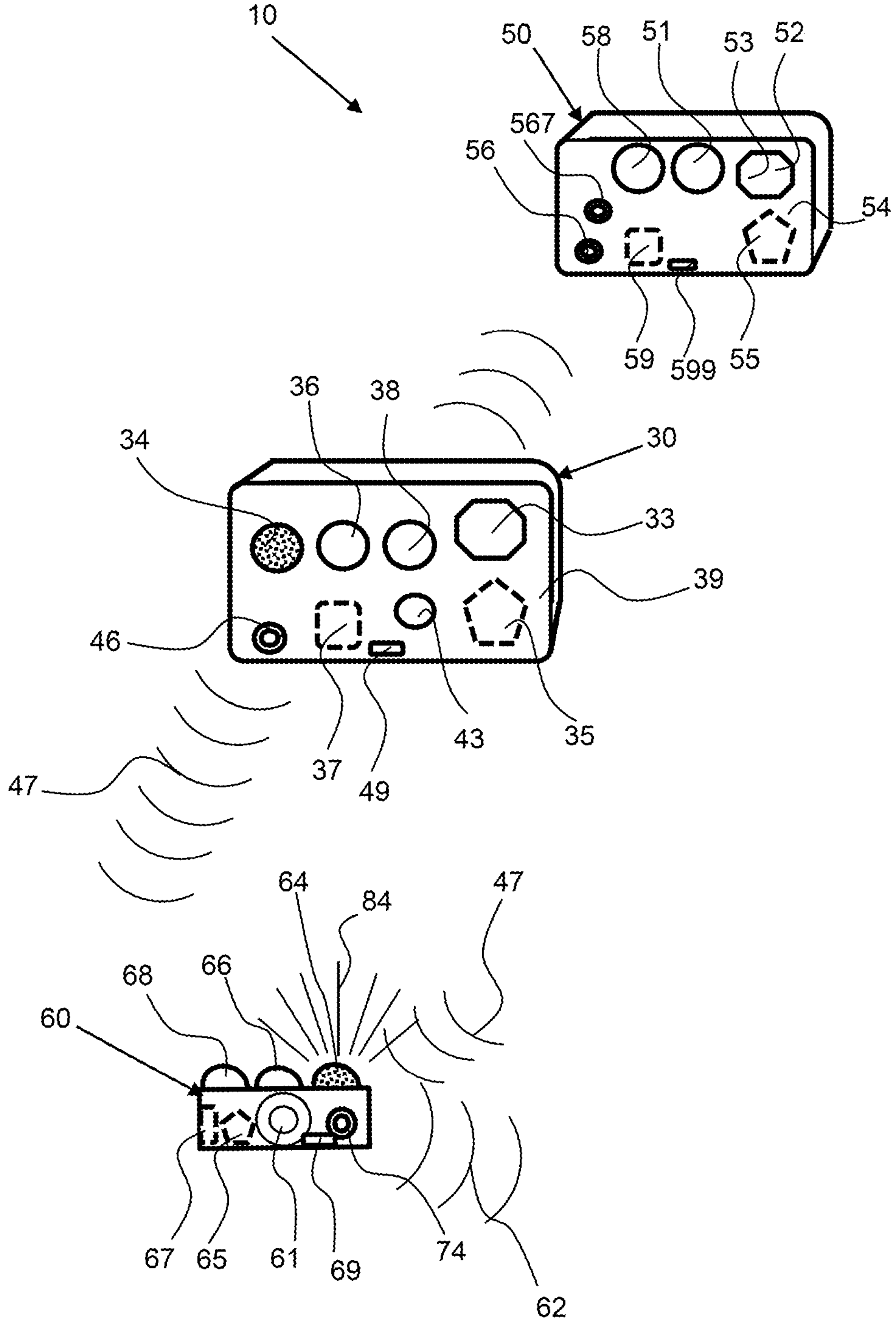
FIG. 2 shows an exemplary competition starting system with the start-receiver configured to detect a venue start sound, a start-controller having the ready button activated and transmitting a wireless signal to the start signaling devices with ready instructions to activate a light device to produce a ready light to indicate that the competitors should get ready.

As shown in FIG. 2, the competition starting system 10 has he ready button 34 on the start-controller 30 activated to indicated that the competitors are to get ready for the competition. The start signaling device has received the wireless signal 47 and is illuminating a ready light 84 from the ready light device 64 and/or is emitting a ready sound from lane speaker 61. The ready light device 64 may flash to indicate that the competitors have time to get ready. Also, the ready sound may be short consecutive sounds to indicate to get ready. The ready button 34 on the start-controller 30 may be pressed again to initiate an end of the ready period and this may send a wireless signal to the start signaling device to initiate one or more lights to illuminate and/or sounds to be emitted from the lane speaker. The ready light device 64 may change the ready light 84 from a flashing light to a steady light, such as a steady red color light. Also, the ready sound may be a long continuous sound that indicates the end of the ready period.

Figure 3:
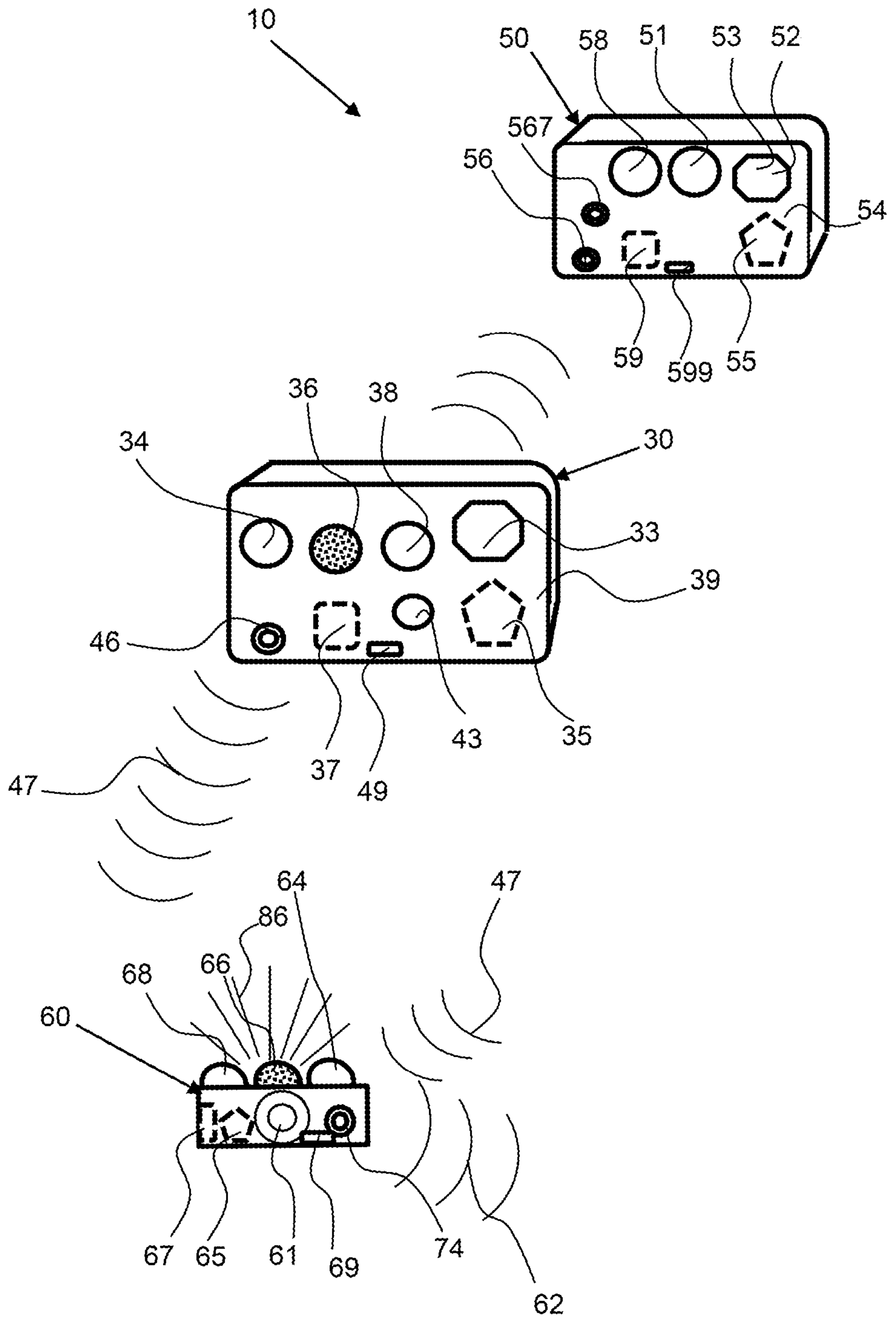
FIG. 3 shows an exemplary competition starting system with the start-controller having the mark button activated and transmitting a wireless signal to the start signaling devices with mark instruction to activate a light device to produce a mark light to indicate that the competitors should take their mark.

As shown in FIG. 3, the mark button 36 on the start-controller 30 has been pushed to indicated that the competitors are to take their mark for the competition. The start signaling device has received the wireless signal 47 and is illuminating a mark light 86 from a mark light device 66 and/or is emitting a mark sound from lane speaker 61. The mark light 86 may be a constant light, such as a blue light. The mark sound may be a specific number of short sounds or a continuous sound for a period of time. Again, the mark light device and the ready light device may be a single light device that emit different types of light for the mark light and ready light. The mark light and ready light may be different colors or may differ in on-off periods and/or intensity of the light, or lumens of light emitted. Also, as described herein, when activating the mark button on the start-controller, the start-controller 30 may send a wireless signal 47 to the start-receiver 50 to place the start-receiver in a "start mode", wherein the start detector 52 is configured to detect a venue start sound.

Figure 4:
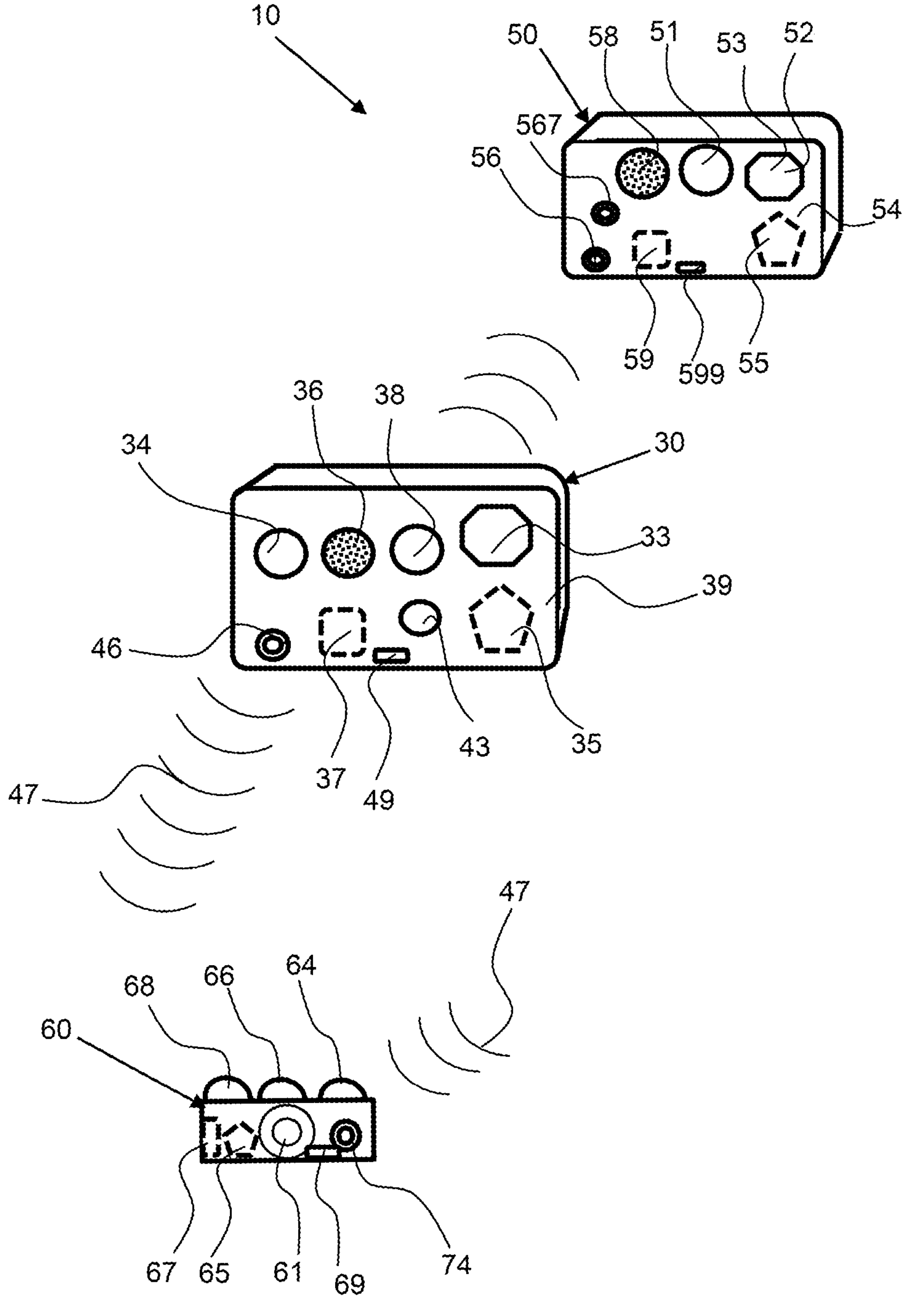
FIG. 4 shows an exemplary competition starting system with the start-controller having the mark button activated and transmitting a wireless signal to the start-receiver to place the start-receiver is a "start mode", wherein the start-receiver is configured to detect a venue start sound and send start instructions to the start signaling devices to activate a light device to produce a start light and to activate the lane-start speaker to emit a lane start sound to indicate that the competitors should start the race or competition.

As shown in FIG. 4, the start button 38 on the start-controller 30 has been pushed to indicated that the competitors are to start the competition. The start-controller 30 then sends a wireless signal 47 via the wireless signal transmitter 46 to the wireless signal receiver 567 of the start-receiver 50. The start mode indicator 58 is then illuminated on the start-receiver 50 to indicate the "start mode." Now the start-receive, in the "start-mode", will send a wireless signal 57 via the wireless signal transmitter 56 with start instructions to the start signaling devices 60 when a venue start sound is detected.

Figure 5:
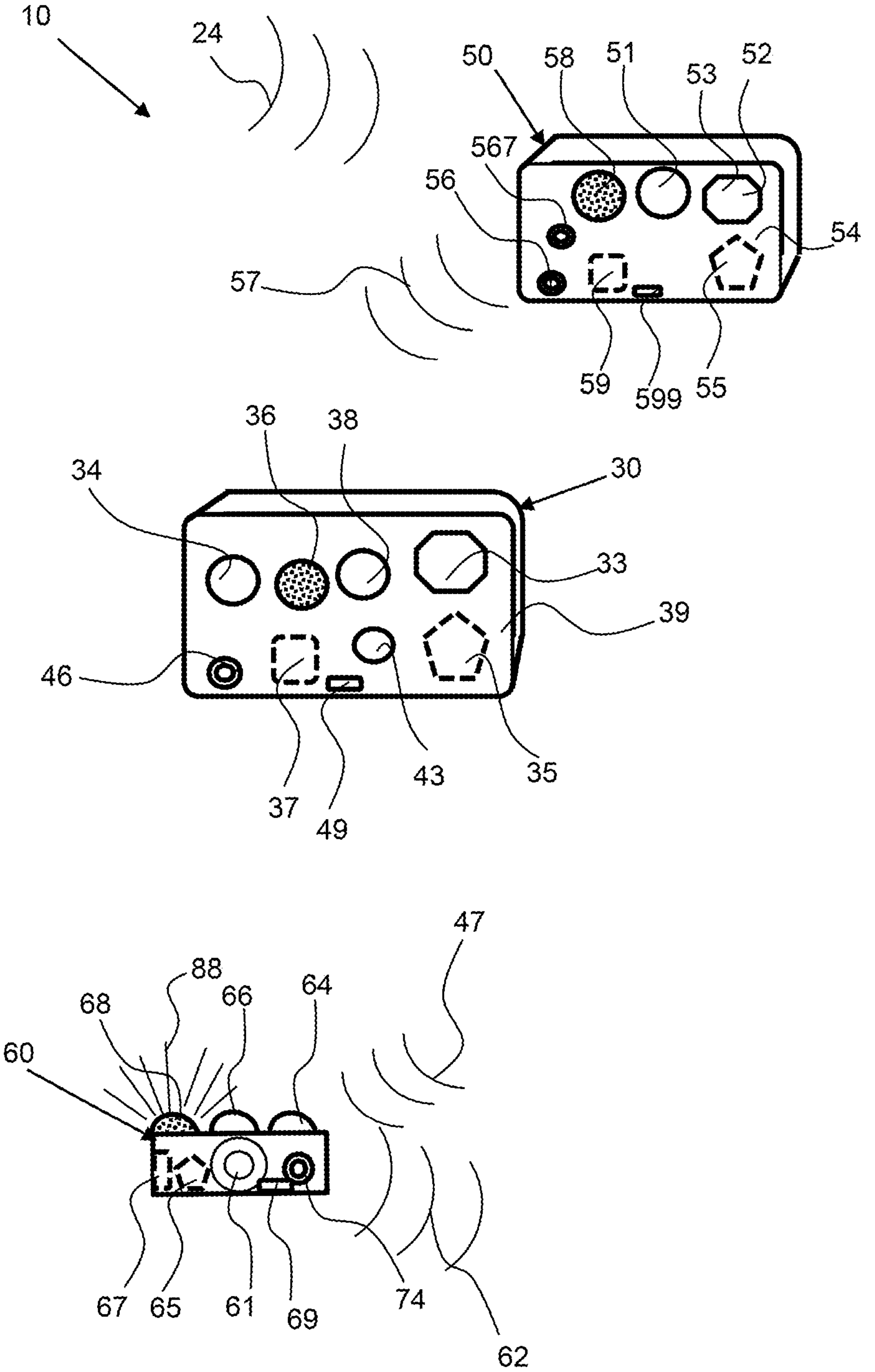
FIG. 5 shows the exemplary competition starting system shown in FIG. 4, receiving the start venue sound and sending instructions wirelessly to the start signaling device to activate a light device to produce a start light and to activate the lane-start speaker to emit a lane start sound to indicate that the competitors should start the race or competition.

As shown in FIG. 5, the start detector 52, such as a microphone 53, has detected the venue start sound 24, and the start-receiver 50, is sending a wireless signal 57, via the wireless signal transmitter 56, with start instructions to the start signaling device 60. The start signaling device has received the wireless signal 57, via the wireless signal receiver 74, and is illuminating a start light 88 from the start light device 68 and/or is emitting a start sound from lane speaker 61. The start light 68 may be a constant light, such as a green light. Again, the start light, ready light and mark light may all be produced from a single light device.

A reset button 43 on the start-controller 30 may be activated after a competition has been started to reset the system, wherein the start-controller sends a wireless signal 47 to the start signaling device 60 to turn off any and all ready, mark, and start lights and stop any sound from the lane speaker. Also, the start-controller may send a wireless signal 47 to the start-receiver 50 to reset the start-receiver and take it out of "start mode" and turn off the start mode indicator 58. Also, the start-receiver may automatically reset after sending a wireless signal 57 with start instructions to the start signaling device. Likewise, the start signaling device 60 may also automatically reset after illuminating a start light 88 from the start light device 68 and/or emitting a start sound from the lane speaker 61.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A competitive starting system for a race competition comprising:

a) a start-receiver comprising:

i) microphone configured to detect a venue start sound from a venue sound device proximal to the start-receiver;

ii) a wireless signal transmitter configured to send a wireless signal with start instructions;

iii) a microcontroller coupled with the microphone and configured to control the functions of the start-receiver;

b) a start-controller comprising:

i) a wireless signal transmitter that sends a wireless signal to the start-receiver to place the start-receiver in a "start mode" to configure the start-receiver to detect said venue start sound;

wherein the start-receiver and start-controller are separate components wherein the start-receiver is configured in a housing and wherein the start-controller is configured in a housing that is separate from the housing of the start-receiver:

c) a plurality of start signaling devices, with a first of said plurality of start signaling device configured at a first lane or between said first lane and a second lane of said race competition, and a second of said plurality of start signaling device configured at said second lane or between said second lane and a third lane of said race competition, wherein each of said plurality of start signaling device comprises:

i) a signal receiver consisting of a wireless signal receiver configured to receive the wireless signal from the wireless signal transmitter of the start-receiver;

ii) a start light device configured to illuminate a start light when the start-receiver detects said venue start sound via the microphone and sends said wireless signal with start instructions;

wherein the start-controller is wirelessly connected to both the start receiver and the plurality of start signaling devices; and whereby when the start-receiver detects said venue start sound when in said start mode, the start-receiver sends a wireless signal with start instructions to the plurality of start signaling devices.

2. The competitive starting system of claim 1, wherein the start-controller further comprises:

a mark button;

wherein the start-receiver only sends a wireless signal with start instructions to the start signaling device to activate the start light device to illuminate a start light when the mark button is activated.

3. The competitive starting system of claim 2, wherein the start-receiver further comprises a start mode indicator to indicate when the start-receiver is in said start mode.

4. The competitive starting system of claim 1, wherein the start-receiver further comprises a start mode indicator to indicate when the start-receiver is in said start mode.

5. The competitive starting system of claim 1, wherein the start signaling device further comprises a lane speaker and wherein the lane speaker emits a start sound from the lane speaker when the signal receiver receives said wireless signal with start instructions.

6. The competitive starting system of claim 1, wherein the start-controller further comprises:

a ready button; and wherein the start-controller sends a wireless signal via the wireless signal transmitter of the start-controller with ready instructions to the start signaling device to activate a ready light, when the ready button is activated.

7. The competitive starting system of claim 6, wherein the start signaling device further comprises a ready light device that emits said ready light when the ready button is activated on the start-controller.

8. The competitive starting system of claim 7, wherein the start signaling device further comprises a lane speaker and wherein the lane speaker emits a ready sound from the lane speaker when the signal receiver of the start signaling device receives said wireless signal with ready instructions.

9. The competitive starting system of claim 7, wherein the start-controller further comprises a mark button and wherein the start-controller sends a wireless signal with mark instructions via the wireless signal transmitter of the start-controller to the start signaling device to activate a mark light, when the mark button is activated;

wherein the start signaling device further comprises a mark light device that emits said mark light when the mark button is activated on the start-controller.

10. The competitive starting system of claim 9, wherein the start signaling device further comprises a lane speaker and wherein the lane speaker emits a mark sound from the lane speaker when the signal receiver of the start signaling device receives said wireless signal with mark instructions.

11. The competitive starting system of claim 1, wherein the start-controller further comprises:

a mark button; and wherein the start-controller sends a wireless signal via the wireless signal transmitter of the start-controller with mark instructions to the start signaling device to activate a mark light, when the mark button is activated;

wherein the start signaling device further comprises a mark light device that emits said mark light when the mark button is activated on the start-controller.

12. The competitive starting system of claim 11, wherein the start signaling device further comprises a lane speaker and wherein the lane speaker emits a mark sound from the lane speaker when the signal receiver receives said wireless signal with mark instructions.

13. The competitive starting system of claim 1, wherein the start-receiver further comprises a battery and is portable and can be carried by a single person.

14. The competitive starting system of claim 13, wherein the start-controller further comprises a battery and is portable and can be carried by a single person.

15. The competitive starting system of claim 14, wherein the start signaling device further comprises a battery and is portable and can be carried by a single person.

16. The competitive starting system of claim 1, wherein the start signaling device has a single light device for producing a ready light, said start light and a mark light.

17. The competitive starting system of claim 1, wherein the start-receiver further comprises a start mode button to place the start-receiver in said "start mode".

* * * * *